United States Patent
Ageishi

(10) Patent No.: US 8,821,665 B2
(45) Date of Patent: Sep. 2, 2014

(54) INTERMEDIATE TRANSFER BELT OF IMAGE RECORDING DEVICE, METHOD FOR MAKING THE SAME, AND IMAGE RECORDING DEVICE

(75) Inventor: Kentaro Ageishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 99 days.

(21) Appl. No.: 13/542,763

(22) Filed: Jul. 6, 2012

(65) Prior Publication Data

US 2013/0242015 A1 Sep. 19, 2013

(30) Foreign Application Priority Data

Mar. 16, 2012 (JP) ................................. 2012-060344

(51) Int. Cl.
*B29C 65/52* (2006.01)
*B29C 65/00* (2006.01)
*B41J 2/005* (2006.01)
*B29L 31/00* (2006.01)

(52) U.S. Cl.
CPC ......... *B29C 66/4322* (2013.01); *B29C 66/4324* (2013.01); *B29L 2031/709* (2013.01); *B41J 2/0057* (2013.01)
USPC .......................... 156/137; 156/218; 156/304.1

(58) Field of Classification Search
CPC .............. B29C 66/432; B29C 66/4322; B29C 66/4324; B29L 2031/709; F16G 3/10; B41J 2/0057
USPC ....................................... 156/137, 218, 304.1
See application file for complete search history.

(56) References Cited

U.S. PATENT DOCUMENTS

| 6,797,445 B2 * | 9/2004 | Maty et al. .................... 430/58.8 |
| 7,097,733 B2 * | 8/2006 | Murayama ................. 156/304.3 |
| 2009/0237479 A1 * | 9/2009 | Yamashita et al. ............ 347/103 |

FOREIGN PATENT DOCUMENTS

| JP | 2004-175001 | 6/2004 |
| JP | 2004-237664 | 8/2004 |
| JP | 2005-161811 | 6/2005 |
| JP | 2007-331169 | 12/2007 |
| JP | 2010-241039 | 10/2010 |

OTHER PUBLICATIONS

Machine Translation in English of Japanese Application No. 2010-241039; dated Oct. 28, 2010.

(Continued)

*Primary Examiner* — Michael Tolin
(74) *Attorney, Agent, or Firm* — Fildes & Outland, P.C.

(57) ABSTRACT

A method includes: shaping a transparent belt base having opposite ends into a tubular shape with the ends thereof spaced away from or in contact with each other to make a tubular belt base; superposing a release base having a liquid layer of a curable polyurethane elastomer on and in contact with the outer periphery of the tubular belt base inclusive of the space or contact portion between the ends in a manner that the liquid layer is sandwiched in between the transparent belt base and the release base; curing the curable polyurethane elastomer while the liquid layer being sandwiched between the transparent belt base and the release base to form a transparent polyurethane elastomer layer; stripping the release base off the transparent polyurethane elastomer layer; and connecting the ends of the tubular transparent belt base spaced away from or in contact with each other to form a joint.

4 Claims, 7 Drawing Sheets

(56) References Cited

OTHER PUBLICATIONS

Machine Translation in English of Japanese Application No. 2007-331169; dated Dec. 27, 2007.
Machine Translation in English of Japanese Application No. 2005-161811; dated Jun. 23, 2005.
Machine Translation in English of Japanese Application No. 2004-237664; dated Aug. 26, 2004.
Machine Translation in English of Japanese Application No. 2004-175001; dated Jun. 24, 2004.

* cited by examiner

INTERMEDIATE TRANSFER BELT OF IMAGE RECORDING DEVICE, METHOD FOR MAKING THE SAME, AND IMAGE RECORDING DEVICE

CROSS-REFERENCE TO RELATED APPLICATIONS

This application is based on and claims priority under 35 USC 119 from Japanese Patent Application No. 2012-060344 filed on Mar. 16, 2012.

BACKGROUND

1. Technical Field

This invention relates to an intermediate transfer belt (ITB) of an image recording device, a method for making the ITB, and an image recording device.

2. Related Art

An inkjet recording method in which an image is once formed on an intermediate transfer belt (ITB) by an inkjet recording system and is transferred onto a recording medium has been studied.

SUMMARY

According to an aspect of the invention, there is provided a method for making an intermediate transfer belt for use in an image recording device comprising the steps of:

shaping a transparent belt base having opposite ends into a tubular shape with the ends thereof spaced away from or in contact with each other to make a tubular belt base, superposing a release base having a liquid layer of a curable polyurethane elastomer on and in contact with the outer periphery of the tubular belt base inclusive of the space or contact portion between the ends in a manner that the liquid layer is sandwiched in between the transparent belt base and the release base, curing the curable polyurethane elastomer while the liquid layer being sandwiched between the transparent belt base and the release base to form a transparent polyurethane elastomer layer, stripping the release base off the transparent polyurethane elastomer layer, and connecting the ends of the tubular transparent belt base spaced away from or in contact with each other to form a joint.

BRIEF DESCRIPTION OF THE DRAWINGS

Exemplary embodiments of the present invention will be described in detail based on the following figures, wherein.

DESIGNATION OF NUMERICAL REFERENCES

Figure 1:
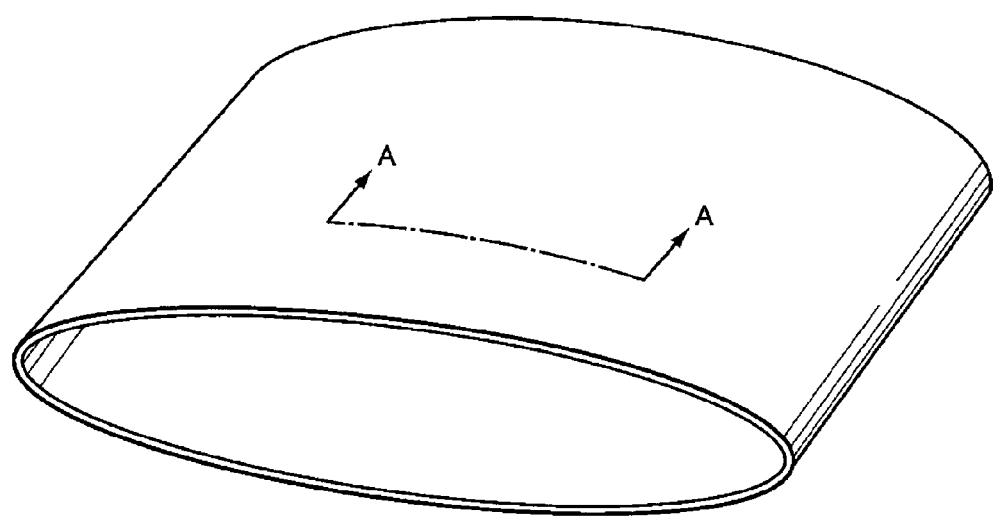
FIG. 1 is a schematic perspective of an exemplary embodiment of the ITB according to the invention.

10: Intermediate transfer belt (ITB)
10A, 10B, 10C: Guide rollers
12: Curable layer forming unit
12B: Curable layer
12C: Housing
12D: Feed roller
12E: Blade
14, 14K, 14C, 14M, 14Y: Inkjet recording heads (an example of ejector)
14A: Ink droplet
16: Pressing unit
16A: Pressing roller
16B: Guide roller
18: Light emitter
20: Scraper
20A: Scraping member
20B: Container
24: Release agent layer forming unit
24A: Release agent
24B: Release agent layer
24C: Housing
24D: Feed roller
24E: Blade
28: Main controller
30: Transparent belt base
32: Transparent polyurethane elastomer layer (outer transparent PUE layer)
34: Surface release layer
36: Transparent polyurethane elastomer layer (inner transparent PUE layer)
38: Joint
101: Image recording device

DETAILED DESCRIPTION

Exemplary embodiments of the invention, which are mere examples of the invention, are to be explained in detail.

[Intermediate Transfer Belt (ITB)]

Figure 2:
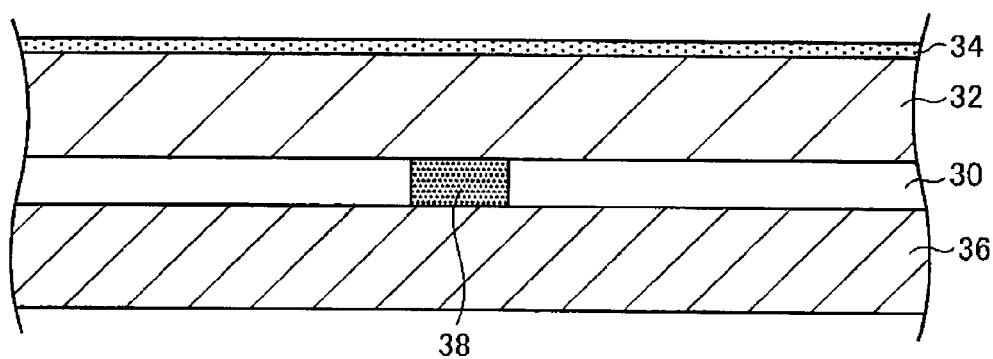
FIG. 2 is a schematic cross-section of the ITB shown in FIG. 1, taken along line A-A.

An exemplary embodiment of the ITB according to the invention is schematically illustrated in FIG. 1. FIG. 2 is a schematic cross-sectional view of the ITB of the present embodiment, taken along line A-A in FIG. 1.

As illustrated in FIGS. 1 and 2, the ITB 10 of the present embodiment includes a transparent base 30 the opposite ends thereof connected to each other via a joint 38, a transparent polyurethane elastomer layer 32 provided on the outer periphery of the transparent belt base 30 (hereinafter referred to as an outer transparent PUE layer 32), a surface release layer 34 provided on the outer periphery of the outer transparent PUE layer 32, and a transparent polyurethane elastomer layer 36 provided on the inner periphery of the transparent belt base 30 (hereinafter referred to as an inner transparent PUE layer 36). The surface release layer 34 and the inner transparent PUE layer 36 are optional layers provided where needed.

The ITB belt 10 of the present exemplary embodiment is for use in an image recording device including an ITB, a feeder feeding an image recording composition containing a photocurable material to the ITB to form a curable layer, an ejector ejecting droplets onto the curable layer formed on the ITB, and a light emitter emitting light to the curable layer to cure the curable layer.

The ITB 10 of the present embodiment and methods for making the ITB 10 will be described in detail.

[First Exemplary Embodiment of Method]

FIGS. 3A to 3C and FIGS. 4D to 4F illustrate the steps for making the ITB 10.

Figure 3A:
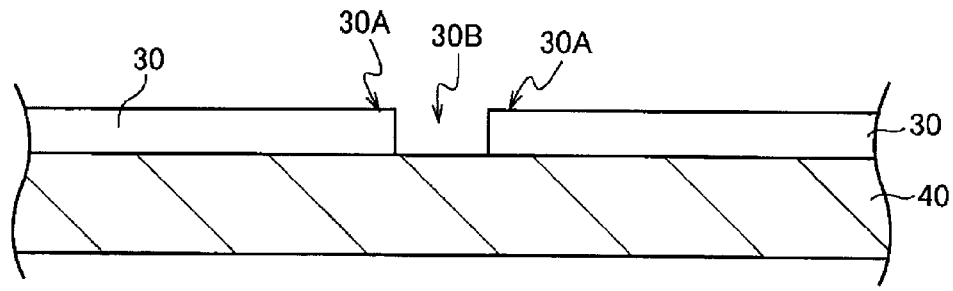
FIG. 3A, FIG. 3B, and FIG. 3C show a first exemplary embodiment of the method for making an ITB according a first aspect of the invention.

In a first exemplary embodiment of the method for making the ITB 10, a transparent belt base 30 having opposite ends 30A is shaped into a tubular shape with its ends 30A spaced away from each other by a space 30B as illustrated in FIG. 3A. The transparent belt base 30 may be shaped into a tubular shape with its ends 30A in contact with each other. The space 30B or the contact portion between the ends 30A becomes a joint 38.

For example, a tubular jig 40 may be provided. A transparent belt base 30 having opposite ends 30A is wrapped around the outer periphery of the tubular jig 40 to form a tubular shape with a space 30B left between the opposite ends 30A. The term "opposite ends" of the transparent belt base 30 denotes the ends adjacent to each other in the circumferential direction when the transparent belt base 30 is bent to make a tubular shape.

The transparent belt base 30 is made of a material containing a light-transmitting material. The light-transmitting material is preferably at least one of polyester, polybutylene terephthalate, nylon 9, polylactic acid, polyether sulfone, polyallylate, polypropylene, polyethylene, cyclic polyolefins, polyether sulfone, polycarbonate, polyimide, and polyamideimide. More preferred of them are polyimide (particularly fluorine-modified polyimide prepared using an aliphatic monomer), polyester, polybutylene terephthalate, nylon 9, polyether sulfone, and polyallylate.

The transparent belt base 30 is prepared by molding methods, including melt molding, such as centrifugal molding, injection molding, extrusion, blown film extrusion, and blow molding; and liquid film formation, such as dip coating, ring flow coating.

In order to improve adhesion to the outer transparent PUE layer or the inner transparent PUE layer, the transparent belt base 30 may have a surface treatment layer on one or both sides thereof formed by applying an olefin polymer (e.g., ethylene-vinyl acetate copolymer or ethylene-acrylic acid copolymer) or a silicone adhesive.

The transparent belt base 30 preferably has a thickness of 30 to 500 µm, more preferably 30 to 200 µm.

As used herein, the terms "transparent" and "light transmitting" mean capable of transmitting light from a light emitter. More specifically, these terms preferably mean having a transmittance of at least 70% for light from a light emitter.

Figure 3B:
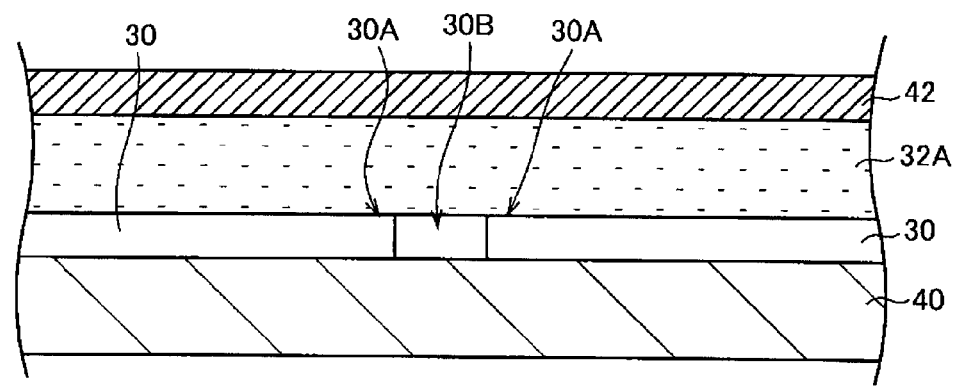

As illustrated in FIG. 3B, a release base 42 having a liquid layer 32A of an uncured, photocurable polyurethane elastomer (hereinafter referred to as an uncured PUE liquid layer 32A) is then superposed on and in contact with the outer periphery of the tubular belt base 30 inclusive of the space 30B between the opposite ends 30A in a manner that the uncured PUE liquid layer 32A is sandwiched in between the transparent belt base 30 and the release base 42.

For example, the release base 42 having the uncured PUE liquid layer 32A may be stuck on the outer periphery of the transparent belt base 30 in a manner that the uncured PUE liquid layer 32A may cover not only the outer periphery of the transparent belt base 30 but the space 30B between the opposite ends 30A of the transparent belt base 30. Because the uncured PUE liquid layer 32A has flowability to some extent, even when the outer periphery of the tubular transparent belt base 30 has unevenness, the uncured PUE liquid layer 32A fills a depression and embeds a projection. Since the uncured PUE liquid layer 32A is sandwiched between the transparent belt base 30 and the release base 42, the smoothness of the outer periphery of the uncured PUE liquid layer 32A is maintained in conformity with the smooth surface of the release base 42. That is, even when the transparent belt base 30 has a joint 38 (the space 30B between the ends 30A in the present embodiment) that forms surface unevenness, the smoothness of the outer periphery of the uncured PUE liquid layer 32A is maintained. Thus, there is formed a smooth outer surface continuous over the circumference of the transparent belt base 30 inclusive of the joint 38 in conformity with the surface properties of the release surface of the release base 42.

Figure 3C:
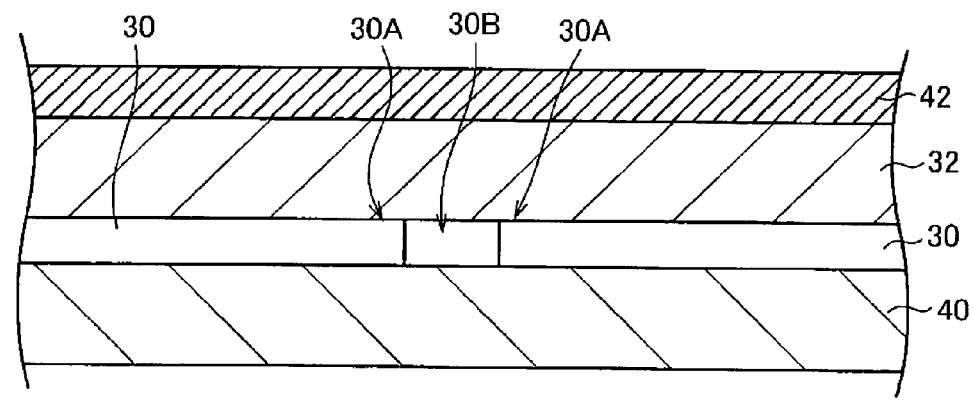

As illustrated in FIG. 3C, the curable polyurethane elastomer of the uncured PUE liquid layer 32A between the transparent belt base 30 and the release base 42 is cured to become an outer transparent PUE layer 32. Thereafter, the release base 42 is stripped off from the outer transparent PUE layer 32.

For example, the uncured PUE liquid layer 32A is given curing stimulation, such as ultraviolet radiation, electron beam, or heat, selected according to the properties of the curable polyurethane elastomer. The curable polyurethane elastomer thus cures to form the outer transparent PUE layer 32. That is, the curable polyurethane elastomer cures to form the outer transparent PUE layer while the outer periphery of the uncured PUE liquid layer 32A maintains the smoothness. As a result, the outer transparent PUE layer 32 forms on the outer periphery of the transparent belt base 30 while retaining the smoothness on its outer periphery.

Examples of the curable polyurethane elastomer forming the outer transparent PUE layer include radical polymerizable, photocurable transparent polyurethane elastomers, e.g., VISLEA from Inoac Corp., cation polymerizable photocurable transparent polyurethane elastomers, e.g., FP2010 and V9520 both from DIC, and heat curable transparent polyurethane elastomers, e.g., Pando 156A from ThreeBond Co., Ltd. While the heat curable transparent polyurethane elastomers may be of solvent or solventless type, it is recommended to use a solventless elastomer because a solvent-based elastomer involves air bubble formation or large volumetric contraction on adhesion. Preferred of these curable polyurethane elastomers are radical polymerizable photocurable transparent polyurethane elastomers, e.g., VISLEA from Inoac Corp. and cation polymerizable photocurable transparent polyurethane elastomers, e.g., FP2010 and V9520 both from DIC.

The outer transparent PUE layer 32 preferably has such a thickness that the surface smoothness of its outer periphery is secured even above the joint 38 (the space 30B between the opposite ends 30A in the present embodiment) that might cause the surface unevenness. More concretely, the thickness is preferably 30 to 200 µm, more preferably 50 to 100 µm.

Figure 4D:
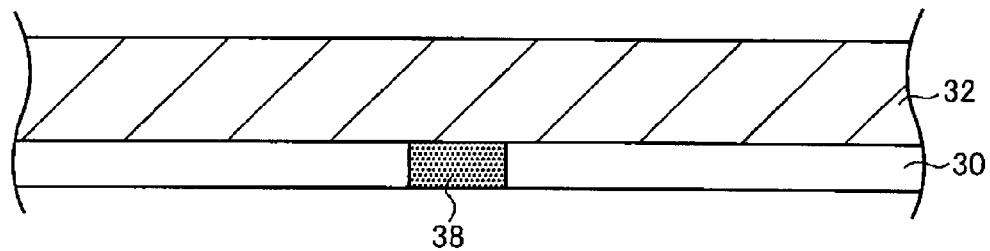
FIG. 4D, FIG. 4E, FIG. 4F show the first exemplary embodiment of the method for making an ITB according a first aspect of the invention.

The spaced opposite ends 30A of the tubular transparent belt base 30 are connected to each other to form the joint 38 as illustrated in FIG. 4D. For example, the laminate composed of the transparent belt base 30 and the outer transparent PUE layer 32 is removed from the tubular jig 40, and the space 30B between the opposite ends 30A is filled with an adhesive or a pressure sensitive adhesive applied from the inner side of the transparent belt base 30. The adhesive or pressure sensitive adhesive is then cured to connect the opposite ends 30A of the transparent belt base 30. There is thus obtained an endless transparent belt base 30.

The adhesive used to form the joint 38 may be, for example, a hot melt adhesive, a heat curable adhesive, or an UV curable adhesive. The pressure sensitive adhesive may be, for example, a silicone pressure sensitive adhesive, an olefin pressure sensitive adhesive, a urethane pressure sensitive adhesive, or a photocurable adhesive. The adhesive and the pressure sensitive adhesive are preferably transparent.

After the step of forming the joint 38 (i.e., after the step of connecting the opposite ends 30A of the transparent belt base 30 with an adhesive or a pressure sensitive adhesive), it is preferred to heat-press the laminate of the transparent belt base 30 and the outer transparent PUE layer 32. The heat pressing increases the strength of the joint 38 and helps to reduce a level difference on the inner periphery of the transparent belt base 30 between the joint 38 and the other part of the transparent belt base 30. In the case when the opposite ends of the transparent belt base 30 overlap each other by about 0.1 to 30 mm, the overlapping portion may be temporarily joined together by heat pressing, impulse welding, or ultrasonic seam welding prior to the formation of the joint 38 taking the level difference into consideration.

The step of forming the joint 38 (i.e., the step of connecting the opposite ends 30A of the transparent belt base 30) does not always need to be done after the formation of the outer transparent PUE layer 32. That is, the step may be carried out after shaping the transparent belt base 30 into a tube and before the formation of the outer transparent PUE layer 32, specifically before the contact of the uncured PUE liquid layer 32A with the outer periphery of the tubular transparent belt base 30. In this case, although the joint 38 formed before the formation of the outer transparent PUE layer 32 can cause surface unevenness, the smoothness of the outer periphery of the uncured PUE liquid layer 32A will be maintained.

The step of forming the joint 38 may also be performed after formation of a surface release layer 34 hereinafter described.

Figure 4E:
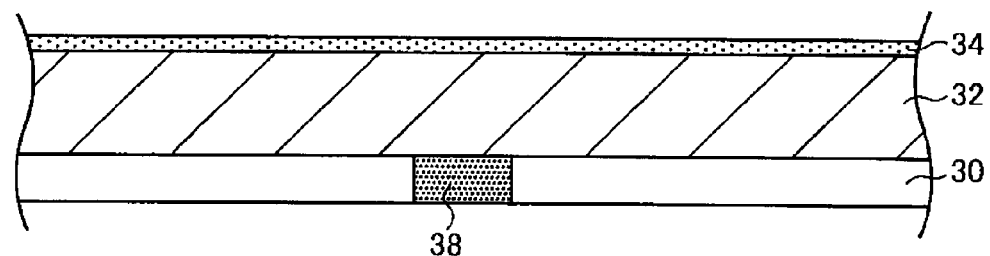

A surface release layer 34 is formed on the outer periphery of the outer transparent PUE layer 32 as illustrated in FIG. 4E. For example, the surface release layer 34 may be formed by applying a surface release layer-forming coating composition and drying or curing the coating layer. The coating is achieved by a known method, such as bar coating, spray coating, inkjet coating, air knife coating, slit die coating, blade coating, roller coating, comma roller coating, anilox roller coating, or syringing using a dispenser.

A surface release layer 34 may also be formed by making an endless member (i.e., a tubular member) and fitting the laminate of the transparent belt base 30 and the outer transparent PUE layer 32 onto the inner periphery of the tubular member.

The surface release layer 34 is suitably made of materials exhibiting excellent release properties so that a cured layer of an image recording composition containing a photocurable material may be easily released therefrom. Examples of such materials include olefin materials, cyclic olefin materials, fluorine-containing materials, and silicone rubbers, with olefin materials, cyclic olefin materials, and fluorine-containing materials being preferred.

The surface release layer 34 preferably has a thickness of 1 to 100 μm, more preferably 3 to 80 μm.

Figure 4F:
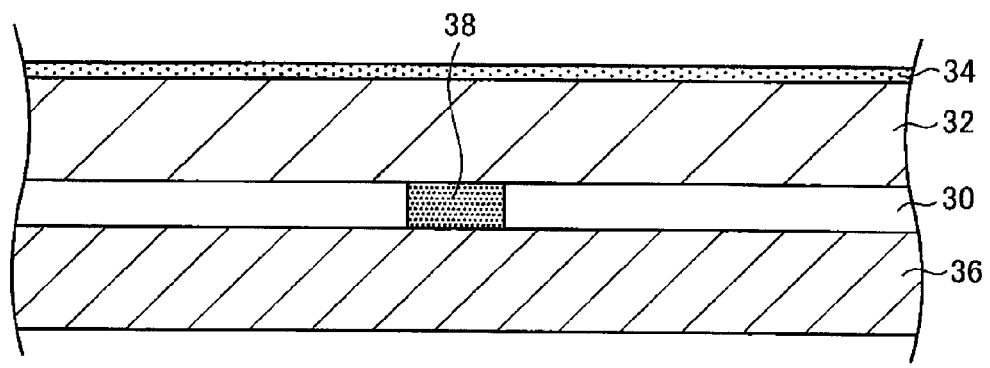

Then, as illustrated in FIG. 4F, an inner transparent PUE layer 36 is formed on the inner periphery of the transparent belt base 30. For example, the inner transparent PUE layer 36 may be formed by applying a liquid curable (uncured) polyurethane elastomer and curing the coating layer. The coating is achieved by a known method, such as centrifugal coating, bar coating, spray coating, inkjet coating, air knife coating, slit die coating, blade coating, roller coating, comma roller coating, or anilox roller coating.

In order to maintain the surface smoothness of the inner periphery of the inner transparent PUE layer 36 even when the transparent belt substrate 30 has the joint 38 that may cause surface unevenness, it is recommended that the inner transparent PUE layer 36 be formed by applying the liquid curable polyurethane elastomer by centrifugal coating, followed by curing.

The inner transparent PUE layer 36 may also be formed by the same technique as used to form the outer transparent PUE layer 32.

The curable polyurethane elastomer used to form the inner transparent PUE layer 36 may be selected from the photo- or heat-curable polyurethane elastomers usable to form the outer transparent PUE layer 32.

The inner transparent PUE layer 36 preferably has such a thickness that the surface smoothness of its outer periphery is secured even on the joint 38 (the space 30B between the opposite ends 30A in the present embodiment) that can cause the surface unevenness. More concretely, the thickness is preferably 30 to 500 μm, more preferably 50 to 300 μm.

The ITB 10 of the present embodiment is thus obtained through the above described steps.

While in the above described first embodiment of the method for making the ITB 10 the transparent belt base 30 having opposite ends 30A (the ends formed by cutting a transparent belt base in the thickness direction) is bent into a tubular shape with the ends 30A spaced away from each other, and the spaced ends 30A are then connected to form the joint 38, the transparent belt base 30 may be bent into a tubular shape with its opposite ends 30A in contact with each other, and the ends 30A are bonded to each other to form the joint 38.

Figure 5:
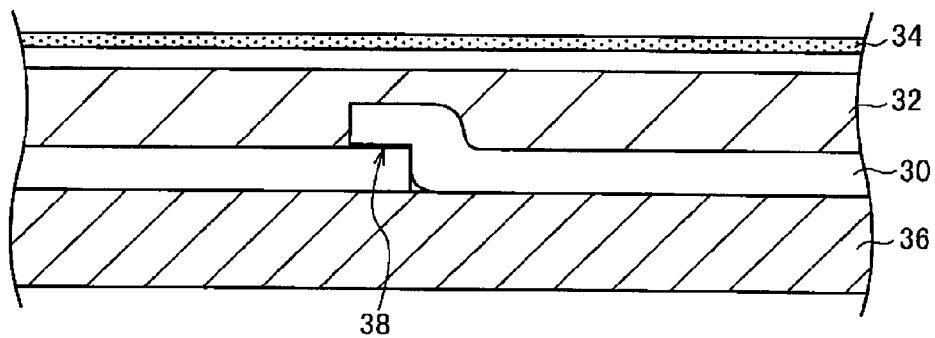
FIG. 5 is a schematic cross-section of another exemplary embodiment of the ITB according to the invention.
Figure 6:
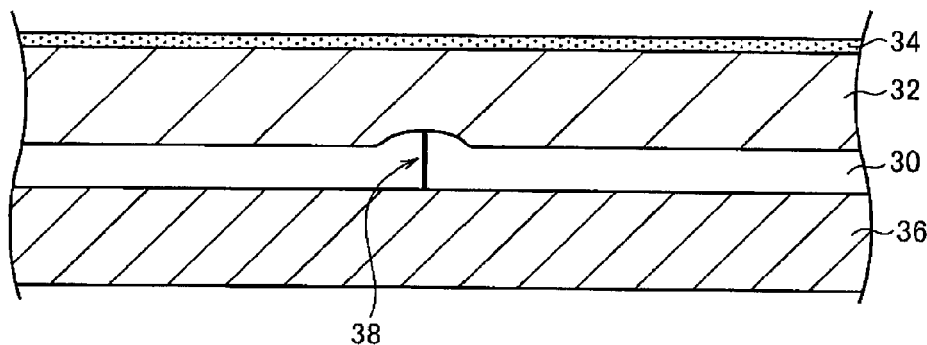
FIG. 6 is a schematic cross-section of still another exemplary embodiment of the ITB according to the invention.
Figure 7:
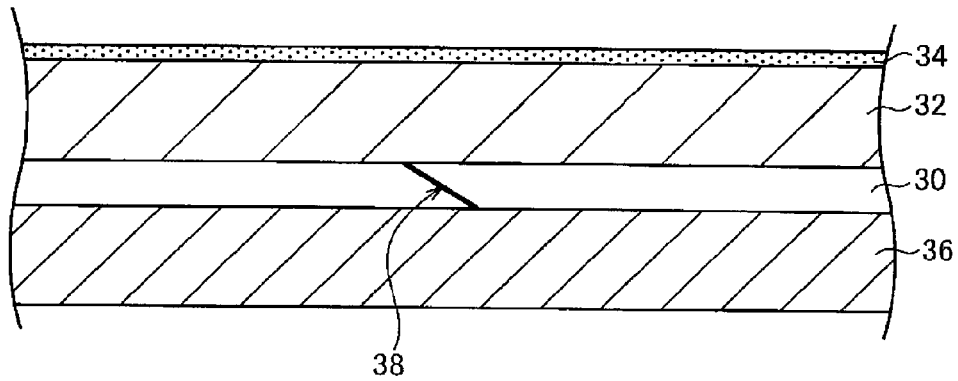
FIG. 7 is a schematic cross-section of yet another exemplary embodiment of the ITB according to the invention.

For example, the transparent belt base 30 having opposite ends 30A (the ends formed by cutting a transparent belt base in the thickness direction) may be bend into a tubular shape with its opposite ends 30A overlapping each other, and the overlapping ends 30A are bonded together to form a lap joint 38 as illustrated in FIG. 5. In another example, the transparent belt base 30 having opposite ends 30A may be bend into a tubular shape with its opposite ends 30A butted to each other, and the butted ends 30A are bonded together to form a butt joint 38 as illustrated in FIG. 6. In still another example, the transparent belt base 30 having opposite ends 30A (the ends formed by cutting a transparent belt base obliquely (to slope) in the thickness direction) may be bend into a tubular shape with the opposite sloping cut ends 30A fitted together, and the fitted ends 30A are bonded together to form a scarf joint 38 as illustrated in FIG. 7. In short, the joint 38 of the transparent belt base 30 in the ITB 10 may have any design and may be formed by a known bonding method.

The opposite ends 30A of the transparent base 30 that are in contact with each other as described may be bonded to form the joint 38 by any technique, such as ultrasonic welding, laser welding, impulse welding, or adhesion with an adhesive or a pressure sensitive adhesive.

As discussed above, the first embodiment of the method for making the ITB 10 of the present embodiment includes the step of bending a transparent belt base 30 having opposite ends 30A into a tubular shape with its ends 30A spaced away by a space 30B (or in contact with each other), the step of superposing a release base 42 having a uncured PUE liquid layer 32A on and in contact with the outer periphery of the tubular belt base 30 inclusive of the space 30B (or the contact portion) between the opposite ends 30A in a manner that the uncured PUE liquid layer 32A is sandwiched in between the transparent belt base 30 and the release base 42, the step of curing the curable polyurethane elastomer to form an outer transparent PUE layer 32 while the uncured PUE liquid layer 32A is in between the transparent belt base 30 and the release base 42, the step of stripping the release base 42 from the outer transparent PUE layer 32, and the step of connecting the ends 30A, which are spaced away from each other (or in contact with each other), of the tubular transparent belt base 30 to form a joint 38.

According to the first embodiment of the method for making the ITB 10 of the present embodiment, the curable polyurethane elastomer is cured to form the outer transparent PUE layer 32 while the uncured PUE liquid layer 32A is sandwiched between the transparent belt base 30 and the release base 42.

Therefore, even when there is a joint 38 (the space 30B between the ends 30A in this particular embodiment) in the transparent belt base 30 that can cause surface unevenness, the curable polyurethane elastomer cures while maintaining the outer surface smoothness of the uncured PUE liquid layer 32A. As a result, the resulting outer transparent PUE layer 32 thus maintains the outer peripheral surface smoothness of the uncured PUE liquid layer 32A. Thus, the ITB 10 of the present embodiment has a reduced level difference on its outer periphery that might result from the joint 38 of the transparent belt base.

Furthermore, since the ITB 10 of the present embodiment is produced by the method further including the step of forming an inner transparent PUE layer 36 on the inner periphery of the transparent belt base 30 after the step of forming the joint 38, the ITB 10 of the present embodiment shows a reduced level difference on its inner periphery that might result from the joint 38 of the transparent belt base.

Moreover, since the ITB 10 of the present embodiment is produced by the method further including the step of forming a surface release layer 34 on the outer periphery of the outer transparent PUE layer 32 after the step of forming the outer transparent PUE layer 32 on the outer periphery of the transparent belt base 30, the ITB 10 of the present embodiment exhibits not only excellent release but cleanability and dust-proofness.

[Second Exemplary Embodiment of Method]

The ITB 10 of the present embodiment is not limited by the above described first embodiment of the method. For example, it may be made by the following method of the invention (hereinafter referred to as a second embodiment of the method).

The second embodiment of the method for making the ITB 10 will then be discussed by way of FIGS. 8A through 8D and FIGS. 9E through 9I in which the steps for making the ITB 10 are illustrated.

Figure 8A:
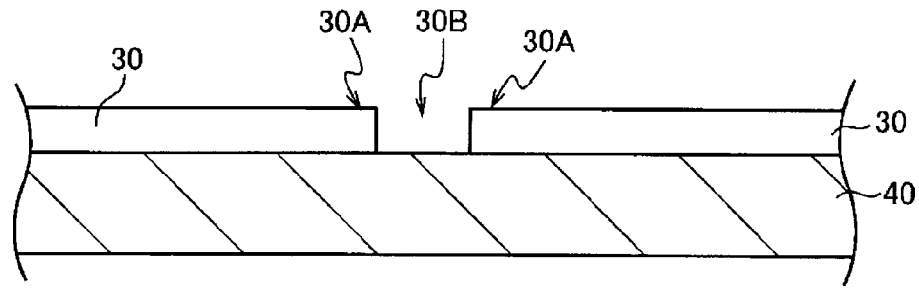
FIG. 8A, FIG. 8B, FIG. 8C, and FIG. 8D show a second exemplary embodiment of the method for making an ITB according to the invention.
Figure 8B:
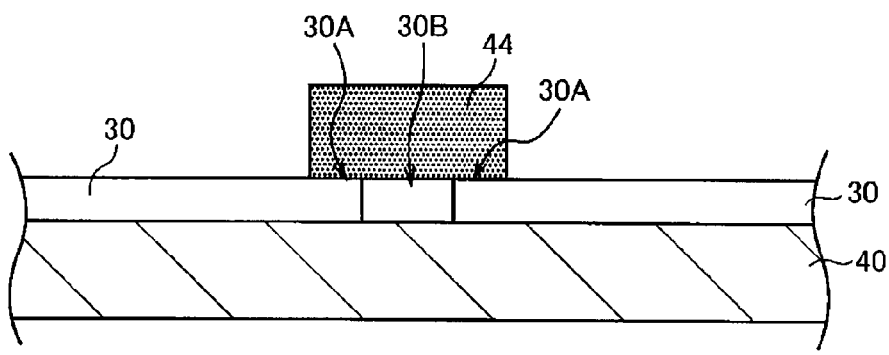
Figure 8C:
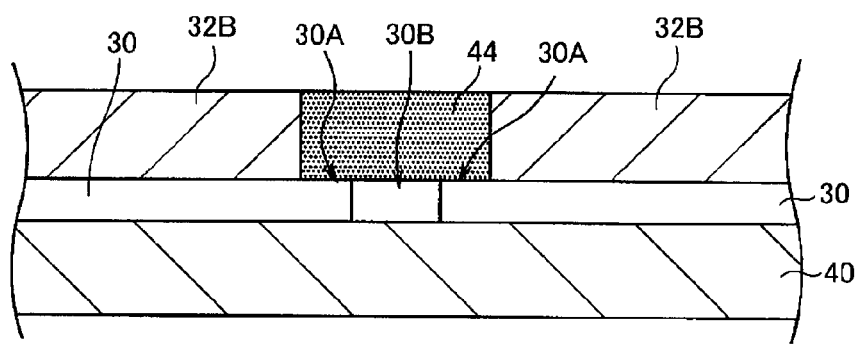
Figure 8D:
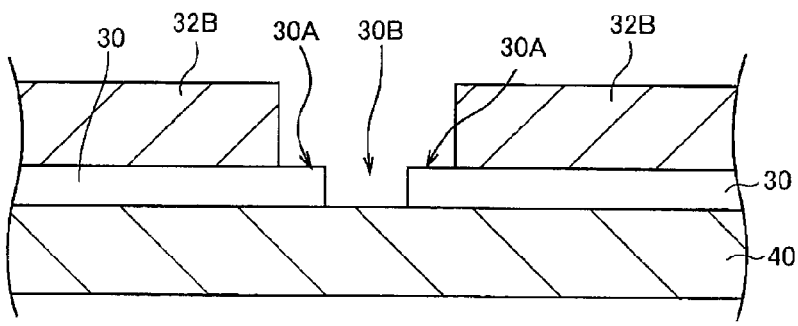

As in the first embodiment, a transparent belt base 30 having opposite ends 30A is made into a tubular shape with its ends 30A spaced away from each other by a space 30B as illustrated in FIG. 8A as shown in FIG. 8A. The transparent belt base 30 may be made into a tubular shape with its ends 30A in contact with each other. The space 30B or the contact portion between the ends 30A becomes a joint 38.

Thereafter, as illustrated in FIGS. 8B to 8D and FIGS. 9E and 9F, a transparent polyurethane elastomer layer 32B (hereinafter referred to as a discontinuous transparent PUE layer 32B) is formed on the outer periphery of the tubular transparent belt base 30 exclusive of the space 30B between the ends 30A, and the space 30B between the facing ends of the discontinuous transparent PUE layer 32B positioned above the space 30B between the ends 30A is then filled with a liquid curable polyurethane elastomer 32C, which is cured to form an outer transparent PUE layer (a continuous outer transparent PUE layer 32).

More specifically, the second embodiment of the method is carried out as follows. For example, a covering layer 44 is formed to cover the space 30B between the ends 30A of the tubular transparent belt base 30 (see FIG. 8B). The covering layer 44 may be provided in a configuration as to cover the ends 30A as well as the space 30B of the transparent belt base 30. Because the covering layer 44 is to be removed after the formation of a discontinuous transparent PUE layer 32B, it is advantageously made of a highly releasable olefinic, silicone, or fluorine-containing material or a resin sheet (e.g., a polyethylene terephthalate sheet) surface-treated with such a releasable material.

With the covering layer 44 serving as a mask, the outer periphery of the transparent belt base 30 is then coated with a liquid curable polyurethane elastomer by a known coating technique, such as centrifugal coating, bar coating, spray coating, inkjet coating, air knife coating, slit die coating, blade coating, roller coating, comma roller coating, or anilox roller coating. The liquid curable polyurethane elastomer is cured to form a discontinuous transparent PUE layer 32B (see FIG. 8C).

The covering layer 44 is then removed to provide a discontinuous transparent PUE layer 32B (the ends of which are spaced away from each other) on the outer periphery of the tubular transparent belt base 30 excluding the space 30B between the ends 30A.

The discontinuous transparent PUE layer 32B may be provided otherwise than as described above. For example, a sheet obtained by curing a curable polyurethane elastomer in layer form may be stuck to the outer periphery of the tubular transparent belt base 30 excluding the space 30B between the ends 30A to provide the discontinuous transparent PUE layer 32B.

Figure 9E:
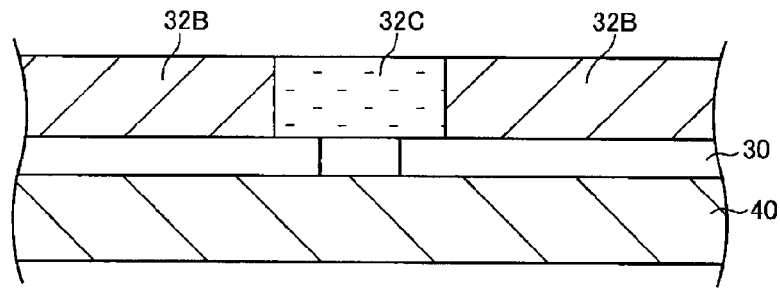
FIG. 9E, FIG. 9F, FIG. 9G, FIG. 9H, and FIG. 9I show the second exemplary embodiment of the method for making an ITB according to the invention.
Figure 9F:
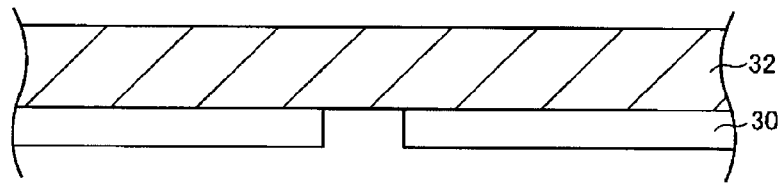

The space 30B of the discontinuous transparent PUE layer 32B positioned above the space 30B between the ends 30A of the transparent belt base 30 may be filled with a liquid curable polyurethane elastomer 32C (see FIG. 9E). After the outer surface of the liquid 32C filling the space 32B is smoothened, the liquid 32C is cured to make the discontinuous transparent PUE layer 32B continuous via a transparent polyurethane elastomer thereby to make an outer transparent PUE layer 32 (see FIG. 9F).

Because the liquid curable polyurethane elastomer 32C has flowability to some extent, even when the tubular transparent belt base 30 has unevenness on its outer periphery (the portion having the space 30B between the ends 30A of the transparent belt base 30), the liquid 32C fills a depression and embeds a projection. That is, even when the transparent belt base 30 has a joint 38 (the space 30B between the ends 30A in the present embodiment) that forms surface unevenness, the smoothness of the outer periphery of the outer transparent PUE layer 32 is maintained.

Figure 9G:
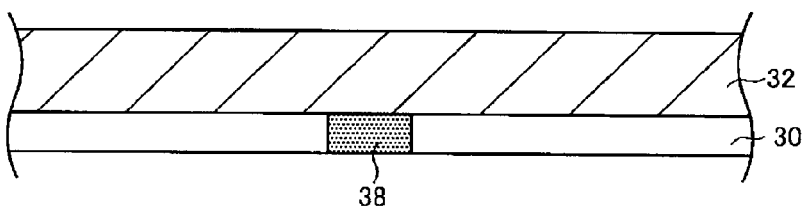
Figure 9H:
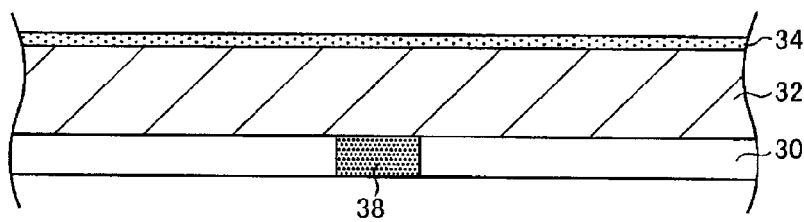
Figure 9I:
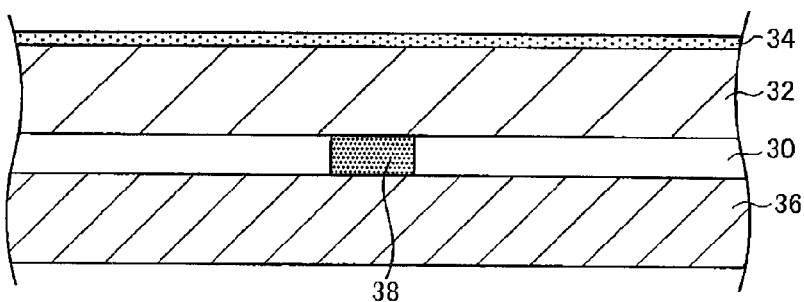

As illustrated in FIG. 9G, the ends 30A of the tubular transparent belt base 30 which are spaced away from each other are connected to form the joint 38. A surface release layer 34 is then formed on the outer periphery of the outer transparent PUE layer 32 as illustrated in FIG. 9H. Finally, an inner transparent PUE layer 36 is provided on the inner periphery of the transparent belt base 30 as illustrated in FIG. 9I.

The ITB 10 of the present embodiment is thus obtained through the above described steps.

As discussed above, the second embodiment of the method for making the ITB 10 includes the step of bending a transparent belt base 30 having opposite ends 30A into a tubular shape with its ends 30A spaced away from each other by a space 30B (or in contact with each other), the step of forming a discontinuous transparent PUE layer 32B on the outer periphery of the tubular belt base 30 exclusive of the space 30B (or the contact portion) between the opposite ends 30A, the step of filling the space 30B of the discontinuous transparent PUE layer 32B positioned above the space 30B (or the contact portion) between the ends 30A with a liquid curable polyurethane elastomer 32C, followed by curing to form a continuous outer transparent PUE layer 32, and the step of connecting the ends 30A, which are spaced away from each other or in contact with each other, of the tubular transparent belt base 30 to form a joint 38.

According to the second embodiment of the method for making the ITB 10, the space 30B of the discontinuous transparent PUE layer 32B positioned above the space 30B between the ends 30A of the transparent belt base 30 is filled with a liquid curable polyurethane elastomer 32C, and, after the outer surface of the liquid 32C is smoothened, the liquid 32C is cured to make the discontinuous transparent PUE layer 32B continuous via a transparent polyurethane elastomer thereby to provide the outer transparent PUE layer 32.

Therefore, even when the tubular transparent belt base 30 has unevenness on its outer periphery (the portion having the space 30B between the ends 30A), the liquid curable polyurethane elastomer 32C having flowability to some extent fills a depression and embeds a projection. That is, even when the transparent belt base 30 has a joint (the space 30B between the ends 30A in the present embodiment) that causes surface unevenness, the smoothness of the outer periphery of the outer transparent PUE layer 32 is maintained.

Thus, the ITB 10 produced by the second embodiment of the method, too, has a reduced level difference on its outer periphery that might result from the joint 38 of the transparent belt base.

The second embodiment of the method for making the ITB 10 illustrated in FIGS. 8A to 8D and FIGS. 9E to 9I is carried out in otherwise the same manner as in the first embodiment of the method illustrated in FIGS. 3A to 3C and FIGS. 4D to 4F.

The ITB 10 of the present embodiment preferably has a tensile strength at break of 8 N/mm or higher at the joint 38 in the circumferential direction. The tensile strength at break in the circumferential direction of the joint 38 is preferably at least 40%, more preferably 60% or more, even more preferably 80% or more, of that of the portion other than the joint 38. The tensile strength at break as referred to herein is measured on a JIS No. 2 dumbbell specimen using a tensile tester at a tensile speed of 50 mm/sec.

The ITB 10 of the present embodiment may have an embossed pattern or a matte pattern on its outer periphery. Specifically, the ITB 10 may have an embossed or matte pattern on the outer periphery of its outer transparent PUE layer 32. For example, when in using the release base 42 having the uncured PUE liquid layer 32A formed thereon, the outer transparent PUE layer 32 may be patterned by previously texturing the surface of the release base 42 by emboss- or matte-patterning on which the uncured PUE liquid layer 32A is to be formed. Upon curing the uncured PUE liquid layer 32A, there is formed the outer transparent PUE layer 32 having the surface texture of the release base 42 transferred thereto. In the case when a separately formed outer transparent PUE layer 32 is stuck to the transparent belt base 30, the surface of a substrate on which the outer transparent PUE layer 32 is to be formed is previously textured so that the surface texture is transferred to the outer periphery of the outer transparent PUE layer 32.

[Image Recording Device]

The image recording device of the invention includes an ITB, a feeder feeding an image recording composition containing a photocurable material to the ITB to form a curable layer, an ejector ejecting droplets onto the curable layer formed on the ITB, and a light emitter emitting light to the curable layer to cure the curable layer, in which the ITB is the above-described ITB of the invention.

An exemplary embodiment of the image recording device according to the invention will be described in detail with reference to FIG. 10.

Figure 10:
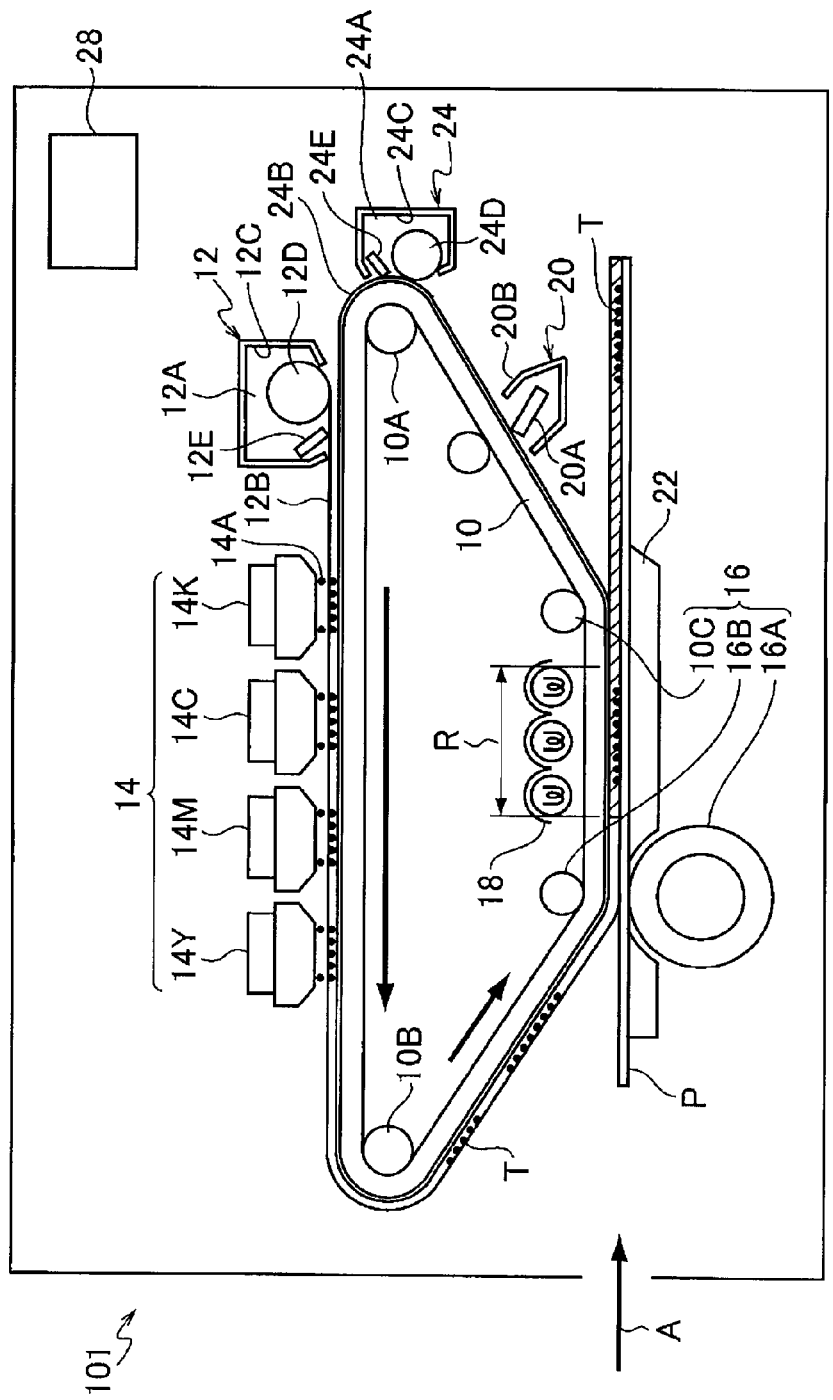
FIG. 10 schematically illustrates an exemplary embodiment of the recording device according to the invention.

FIG. 10 schematically illustrates the configuration of an image recording device 101 of the present embodiment. As illustrated, the image recording device 101 has an ITB 10 on which a layer (a curable layer) of an image recording composition hereinafter described is to be formed and an unshown conveying mechanism for conveying a recording medium P to which a cured layer 12B formed on the ITB 10 is to be transferred.

The conveying mechanism includes a conveyor belt or drum that holds the recording medium P on its outer periphery by, for example, static cling and a pair of feed rollers between which the recording medium P passes. The recording medium P is conveyed in direction A indicated in FIG. 10.

The recording medium P on which the cured layer 12B is to be transferred may be any medium capable of receiving transfer of the curable layer 12B, typically including paper, specifically plain paper, coated paper for inkjet printing, art paper, or synthetic paper. Films of resins, such as polyethylene, polypropylene, polyvinyl chloride, polyurethane, polyethylene terephthalate, polyallylate, polyether sulfone, and cellulose triacetate, are also useful.

On the inner side of the ITB 10 are arranged a series of guide rollers 16B, 10C, 10A, and 10B as an example of a member on which the ITB 10 is entrained. The guide roller 16B is placed upstream from alight emitter 18 (hereinafter described) relative to the direction of the travel of the recording medium p (on the left side of the light emitter 18 in FIG. 10). The guide roller 10C is provided downstream from the guide roller 16B and the light emitter 18 in the direction of the travel of the recording medium P (on the right side of the light emitter 18 in FIG. 10).

The guide roller 10A is placed downstream from the guide roller 10C in the direction of the travel of the recording medium P and on the opposite side to a platen (hereinafter described) relative to the guide roller 10C (i.e., in the right hand side above the guide roller 10C in FIG. 10). The guide roller 10B is disposed upstream from the guide roller 16B relative to the direction of the travel of the recording medium P and on the opposite side to the platen 22 (hereinafter described) relative to the guide roller 16B (i.e., in the left hand side above the guide roller 10C in FIG. 10).

The width (dimension in the axial direction) of the ITB 10 is equal to or larger than the width of the recording medium P. To prevent a zig-zag motion of the ITB 10, the ITB 10 may be provided with a steering rib along its edge.

On the outer side of the ITB 10 (right hand side of FIG. 10) is provided a release agent layer-forming unit 24 that supplies a release agent 24A to the outer surface of the ITB 10 to form a release agent layer 24B on the surface of the ITB 10. Specifically, the release agent layer forming unit 24 is located to face the part of the ITB 10 entrained over the guide roller 10A and configured to feed the release agent 24A to that part of the ITB 10 to form the release agent layer 24B.

The release agent layer forming unit 24 has a length in the lateral direction of the ITB 10 (i.e., the direction perpendicular to the running direction of the ITB 10), the length in the lateral direction being equal to or larger than the lateral width of a region of the ITB 10 where an image is to be recorded.

The release agent layer forming unit 24 may include a housing 24C containing a release agent 24A (e.g., silicone oil, fluorine-containing oil, or wax oil), a feed roller 24D inside the housing 24C that feeds the release agent 24A to the ITB 10, and a blade 24E that controls the thickness of a release agent layer 24B. The release agent layer forming unit 24 may further include a heater (not shown) that heats the release agent 24A to melt.

The release agent layer forming unit 24 may be disposed either in contact with or at a predetermined space from the ITB 10. The release agent layer forming unit 24 may be otherwise configured such as to utilize a known coating technique, e.g., bar coating, spray coating, inkjet coating, air knife coating, slit die coating, blade coating, roller coating, comma roller coating, or anilox roller coating.

Examples of the release agent 24A include silicone oils, fluorine-containing oils, hydrocarbon or polyalkylene glycols, fatty acid esters, phenyl ethers, phosphoric esters, and hydrophobic surfactants. Preferred of them are silicone oils, fluorine-containing oils, polyalkylene glycols, and hydrophobic surfactants.

While the image recording device of the invention has been described with respect to the exemplary embodiment in which a release agent layer 24B is formed on the surface of the ITB 10, the image recording device of the invention may be dispensed with such a release agent layer forming unit 24 when the ITB has surface release properties.

Downstream from the release agent forming unit 24 relative to the running direction of the ITB 10 is provided a curable layer-forming unit (a feeder using a slit die coater) 12 that feeds an image recording composition containing a photocurable material and a liquid absorbent material to the surface of the ITB to form a curable layer 12B.

Specifically, the curable layer forming unit 12 is placed to face the part of the ITB 10 located between the guide rollers 10A and 10B so as to feed the image recording composition to that part to form the curable layer 12B.

The curable layer forming unit 12 has a length in the lateral direction of the ITB 10 (i.e., the direction perpendicular to the running direction of the ITB 10), the length in the lateral direction being equal to or larger than the lateral width of a region of the ITB 10 where an image is to be formed.

The curable layer forming unit 12 may be placed above the guide roller 10A on the outer side of the ITB 10 (the upper side of the ITB 10 in FIG. 10) so as to form the curable layer 12B on the part of the ITB 10 entrained over the guide roller 10A.

The curable layer forming unit 12 may include a housing 12C containing an image recording composition 12A, a feed roller 12D inside the housing 12C that feeds the image recording composition 12A to the ITB 10, and a blade 12E controlling the thickness of the curable layer 12B (the image recording composition fed on the ITB 10).

The curable layer forming unit 12 may be disposed with the feed roller 12D always in contact with or at a predetermined space from the ITB 10. The curable layer forming unit 12 may be configured such that the image recording composition is fed to the housing 12C through a separate liquid feed system (not shown) to assure continuous feed of the composition. The details of the image recording composition will be given later.

The configuration of the curable layer forming unit 12 is not limited to the above and may be such as to utilize a known coating technique, e.g., die coating, bar coating, spray coating, inkjet coating, air knife coating, blade coating, or roller coating.

On the outer side (upper side in FIG. 10) of the ITB 10 and downstream from the curable layer forming unit 12 relative to the running direction of the ITB 10 is provided an inkjet recording head 14 (or an ink ejector) that ejects droplets, e.g., of ink onto the curable layer 12B formed by the curable layer forming unit 12. Specifically, the inkjet recording head 14 is placed to face the flat (non-bent) part of the ITB 10 located between the guide rollers 10A and 10B so as to imagewise deposit ink on that part to form an image.

The inkjet recording head 14 may include an inkjet recording head 14K that ejects black ink droplets, an inkjet recording head 14C that ejects cyan ink droplets, an inkjet recording head 14M that ejects magenta ink droplets, and an inkjet recording head 14Y that ejects yellow ink droplets.

More specifically, the inkjet recording head 14 is a recording head having a plurality of nozzles which is configured to eject ink droplets actuated by an inkjet system, such as a piezoelectric system, a thermal system, or a continuous-stream system, to the surface of the moving curable layer 12B.

The inkjet recording heat 14 has a length in the lateral direction of the ITB 10 (i.e., the direction perpendicular to the running direction of the ITB 10), the length in the lateral direction being equal to or larger than the lateral width of a region of the ITB 10 where an image is to be formed. That is, the inkjet recording head 14 is configured to be capable of forming one image line in the lateral direction (fast scan direction) of the region where an image is to be formed without moving laterally relative to the running direction of the ITB 10.

The inkjet recording head 14 is controlled by a control system, such as a main controller 28. The main controller 28 decides the nozzles to be used and the ejection timing based on image information and causes the inkjet recording head 14 to eject ink droplets to form an image based on the image information. The detailed control on the inkjet recording head 14 and the ink ejected from the inkjet recording head 14 will be described later.

The configuration of the inkjet recording head 14 is not limited to the above and may be of any other type capable of forming an image on the curable layer 12, for example, a scanning type such that the head 14 ejects ink while moving across the ITB 10 to form one image line in the lateral direction (fast scan direction) of the region of the ITB 10 where an image is to be formed.

Downstream from the inkjet recording head 14 in the running direction of the ITB 20 are provided a pressing unit 16 and a platen 22. The pressing unit 16 is configured to press the curable layer 12B having the inkjet droplets 14A deposited thereon onto the recording medium P, and the platen 22 holds the recording medium P flat.

The platen 22 is disposed to face the outer surface of the lower part of the ITB 10, more specifically the part between the guide roller 16B and the guide roller 10C.

The pressing unit 16 includes the guide roller 16B over which the ITB 10 is entrained and a pressing roller 16A placed to face the guide roller 16B with the ITB 10 in between. The pressing unit 16 operates to convey the recording medium P between the ITB 10 and the pressing roller 16A while applying a pressure of the pressing roller 16A toward the guide roller 16B. The recording medium P is further conveyed while being sandwiched between the lower part of the ITB 10 (the part between the guide roller 16B and the guide roller 10C) and the platen 22.

The curable layer 12B on the ITB 10 is thus kept in contact with the moving recording medium P in a transfer region defined to be a region from the position where the ITB 10 and the recording medium P come between the pressing roller 16A and the guide roller 16B (hereinafter also called a contact position) up to the position where the ITB 10 and the recording medium P come between the guide roller 10C and the platen 22 (hereinafter also called a release position).

A light emitter 18 is provided downstream from the pressing unit 16 relative to the running direction of the ITB 10 and on the inner side of the ITB 10. The light emitter 18 emits light from the inner side of the ITB 10 to the curable layer 12B formed on the outer side of the ITB 10 whereby the curable layer 12B having the image formed thereon by the inkjet recording head 14 cures and transfers to the recording medium P. The light emitter 18 is configured to emit light to the curable layer 12B in contact with the recording medium P in the transfer region, whereby the curable layer 12B cures and transfers from the ITB 10 to the recording medium P.

The light emitter 18 is preferably set to provide an irradiated region R (the region of the curable layer 12B irradiated with light from the light emitter 18) of 5 to 300 mm, more preferably 100 to 250 mm, long in the running direction of the ITB 10, while depending on the width of the recorded image.

The light emitter 18 to be used is chosen according to the photocurable material contained in the image recording composition applied. For example, when a UV curable material that cures on irradiation with UV light is used, a UV light emitter that emits UV light to the image recording composition (curable layer 12B) is used. When in using an electron beam (EB) curable material is used, an EB emitter is used as the light emitter 18.

Examples of useful UV light emitter are a metal halide lamp, a high pressure mercury lamp, an ultrahigh pressure mercury lamp, a deep UV lamp, an electrodeless microwave discharge lamp (having mercury excited by microwaves from outside the lamp bulb), a UV laser, a xenon lamp, and a UV-LED. Useful EB emitters include scanning type and area beam type. An EB emitter of area beam type is a device in which thermoelectrons generated from filaments are extracted through the grid in a vacuum chamber, accelerated at once by a high voltage (e.g., 70 to 300 kV), out of a window foil in an electron beam into the atmosphere. An ozoneless UV lamp is effectively used as a light source. A UV-LED lamp is also effective in the image recording device of the invention because of low output, low power consumption, narrow emission range with no harmful UV (365 to 420 nm) nor infrared exposure. Involving no infrared exposure is advantageous in that a rise in temperature is suppressed, which prevents deterioration of the belt material.

Downstream from the light emitter 18 relative to the running direction of the ITB 10 and on the outer side of the ITB 10 is disposed a scraper 20 for removing any image recording composition and release agent 24A remaining on the ITB 10. Specifically, the scraper 20 is located at a position between the part of the ITB 10 entrained over the guide roller 10C and the downstream part of the ITB 10 entrained over the guide roller 10A.

The scraper 20 includes a scraping member 20A that is placed in contact with the ITB 10 to scrape off the image recording composition remaining on the ITB 10. The scraping member 20A may be a plate-like scraping blade made of a rubber material. The scraper 20 further includes a container 20B for containing the image recording composition or the release agent 24A scraped off by the scraping member 20A.

The container 20B is a receptacle with an end open to the ITB 10 for receiving the image recording composition and the release agent 24A which are scraped off by the scraping member 20A and fall by gravity.

The image recording device 101 of the present embodiment operates as follows.

As the ITB 10 rotates, the release agent layer forming unit 24 forms a release agent layer 24B on the surface of the ITB 10. The curable layer forming unit 12 supplies an image recording composition to form a curable layer 12B.

The inkjet recording head 14 ejects ink droplets 14A onto the curable layer 12B to deposit ink dots in agreement with the pixels of image data of the original image under control by the main controller 28. There is thus formed an image area composed of the ink dots on the curable layer 12B.

As used with respect to the present embodiment, the term "image area" is therefore defined to be the area of the curable layer 12B where dots are recorded as a result of ejection of ink droplets 14A.

Note that the ejection of ink droplets 14A by the inkjet recording head 14 is conducted on the non-bent region of the ITB 10 rotating under tension. In other words, the ink droplets 14A are ejected to the curable layer 12B on the ITB 10 having no sag.

When the ITB 10 comes to the contact position, the curable layer 12B is brought into contact with a recording medium P and sandwiched and pressed between the pressing roller 16A and the guide roller 16B. The curable layer 12B continues being in contact with both the ITB 10 and the recording medium P until they reach the release position where the guide roller 10C and the platen 22 face each other.

While the curable layer 12B is in contact with both the ITB 10 and the recording medium P, the light emitter 18 supplies light to the curable layer 12B through the ITB 10, whereby the curable layer 12B on the ITB 10 cures and transfers to the recording medium P.

The amount of light to be applied is desirably such that causes the curable layer 12B to cure completely. In the case of UV light, for example, a desirable amount of light is 10 to 1000 mJ/cm$^2$ in terms of integral light quantity (when the joint does not pass). The optimum light quantity is subject to adjustment according to the actual rate of cure.

While in the present exemplary embodiment the curable layer 12B in contact with both the ITB 10 and the recording medium P cures on exposure to light from the light emitter 18 via the ITB 10, the device 101 may further include an unshown curing unit for completely curing the curable layer 12B after transfer to the recording medium P.

The cured curable layer 12B separates from the ITB 10 at the release position. As a result, a cured resin layer having therein the image area T formed of the ink droplets 14A (i.e., image layer) is formed on the recording medium P.

After the transfer of the cured layer to the recording medium P, the residual image recording composition, the residual release agent 24A, and any foreign matter on the ITB 10 are removed by the scraper 20. An image forming cycle in the image recording device 101 of the present embodiment thus completes.

[Image Recording Composition]

The image recording composition according to the invention essentially contains a photocurable material (hereinafter simply referred to as a curable material). If necessary, the image recording composition contains liquid absorbing particles, a surfactant, and other optional components.

The components making up the image recording composition will then be described in detail.

1. Curable Material

The curable material may be, for example, a UV curable material and an EB curable material. The cure of the curing material is an irreversible process.

Examples of a UV-cured resin obtained by curing a UV curable material include acrylic resins, methacrylic resins, urethane resins, polyester resins, maleimide resins, epoxy resins, oxetane resins, polyether resins, and polyvinyl ether resins. The UV curable material contains at least one of a UV curable monomer, a UV curable macromer, a UV curable oligomer, and a UV curable prepolymer. The UV curable material preferably contains a UV polymerization initiator to accelerate UV cure. Where needed, the UV curable material may further contain a reaction aid or a polymerization accelerator to help the progress of the polymerization, a thickening agent, and the like.

Examples of the UV curable monomer include radical curable materials, such as acrylic esters of an alcohol, a polyhydric alcohol, or an amino alcohol, methacrylic esters of an alcohol, a polyhydric alcohol, or an amino alcohol, aliphatic acrylamides, alicyclic acrylamides, and cyclic acrylamides (morphiline); and cation curable materials, such as epoxy monomers, oxetane monomers, and vinyl ether monomers. Examples of the UV curable macromers, UV curable oligomers, and UV curable prepolymers include those obtained by polymerizing the above described monomers; and radical curable materials obtained by adding an acryloyl or methacryloyl group to an epoxy, urethane, polyester, or polyether structure, such as epoxy acrylate, urethane acrylate, polyester acrylate, polyether acrylate, urethane methacrylate, and polyester methacrylate.

Examples of EB-cured resins obtained by curing the EB curable material include acryl resins, methacryl resins, urethane resins, polyester resins, polyether resins, and silicone resins. The EB curable material contains at least one of an EB curable monomer, an EB curable macromer, an EB curable oligomer, and an EB curable prepolymer.

Examples of the EB curable monomer, macromer, oligomer, and prepolymer are the same as those enumerated as examples of the UV curable material.

The curable material may be any material that cures (for example, undergoes polymerization reaction) on exposure to light, including UV light and EB.

It is preferred to use a curable material containing a curable prepolymer having a molecular weight of 1000 to 50000.

2. Liquid Absorbing Particles

The image recording composition may contain liquid absorbing particles that absorb ink and serve to fix the colorant in the ink. The liquid absorbing particles contain a liquid absorbent material as a main component. As used herein, the term "main component" means a component present in a proportion of at least 50% by mass relative to the mass of the particles. As used herein, the term "liquid absorbent material" refers to a material that increases in weight by at least 5% when mixed with ink in a weight ratio of 30:100 for 24 hours and separated from the ink by filtration.

The liquid absorbent material is selected according to the ink from, for example, resins (hereinafter also referred to as a liquid absorbent resin) and inorganic particles (e.g., silica, alumina, or zeolite particles) having the surface thereof rendered ink-philic. When in using an aqueous ink, a water absorbent material is preferably used as a liquid absorbent material. When in using an oily ink, an oil absorbent material is preferably used as a liquid absorbent material.

Examples of the water absorbent material include polyacrylic acid or a salt thereof, polymethacrylic acid or a salt thereof, (meth)acrylic ester-(meth)acrylic acid (or a salt thereof) copolymers, styrene-(meth)acrylic acid (or a salt thereof) copolymers, styrene-(meth)acrylic ester-(meth) acrylic acid (or a salt thereof) copolymers, styrene-(meth) acrylic ester-carboxylic acid (or a salt thereof) copolymers comprising a (meth)acrylic acid ester with an alcohol having an aliphatic or aromatic substituent, (meth)acrylic ester-carboxylic acid (or a salt thereof) copolymers comprising a (meth)acrylic acid ester with an alcohol having an aliphatic or aromatic substituent, ethylene-(meth)acrylic acid copolymers, butadiene-(meth)acrylic ester-(meth)acrylic acid (or a salt thereof) copolymers, butadiene-(meth)acrylic ester-carboxylic acid (or a salt thereof) copolymers comprising a (meth)acrylic acid ester with an alcohol having an aliphatic or aromatic substituent, polymaleic acid or a salt thereof, and styrene-maleic acid (or a salt thereof) copolymers; and modified resins obtained by modifying the above described resins with sulfonic acid or phosphoric acid. Preferred of them are polyacrylic acid or a salt thereof, styrene-(meth)acrylic acid (or a salt thereof) copolymers, styrene-(meth)acrylic ester-(meth)acrylic acid (or a salt thereof) copolymers, styrene-(meth)acrylic ester-carboxylic acid (or a salt thereof) copolymers comprising a (meth)acrylic acid ester with an alcohol having an aliphatic or aromatic substituent, and (meth)acrylic ester-(meth)acrylic acid (or a salt thereof) copolymers. These resins may be crosslinked or non-crosslinked.

Examples of the oil absorbent material include low-molecular gelling agents, such as hydroxystearic acid, cholesterol derivatives, and benzylidene sorbitol, polynorbornene, polystyrene, polypropylene, styrene-butadiene copolymers, and various rosins, with polynorbornene, polypropylene, and rosins being preferred.

Also useful as liquid absorbing particles are (meth)acrylic acid, (meth)acrylamide, alkylamine compounds ionically bonded to polyvinyl alcohol, hydroxyl compounds, and acidic compounds, such as sulfonic acid and phosphoric acid compounds.

The liquid absorbing particles may be solid particles, liquid particles dispersed in the curable layer as in an emulsion, or partially dissolved particles (for example, a polymer the crosslinks of which are broken to make the molecular chains stretch).

The liquid absorbing particles preferably have a volume average particle size of 0.05 to 25 μm, more preferably 0.05 to 5 μm.

The liquid absorbing particles preferably have a smaller specific gravity than the curable material used in the image recording composition. The amount of the liquid absorbent particles in the image recording composition is preferably 1% to 60%, more preferably 10% to 50%, even more preferably 20% to 40%, by mass.

When the liquid absorbing particles are resin particles containing a liquid absorbent material, the resin particles are prepared by, for example, grinding a resin containing a liquid absorbent material in a ball mill, followed by classification or granulating an emulsion resin obtained by emulsion polymerization by spray drying or freeze drying.

3. Surfactant

Useful surfactants include anionic surfactants, nonionic surfactants, cationic surfactants, and amphoteric surfactants. Preferred of them are anionic or nonionic surfactants. Nonionic surfactants are especially preferred.

Examples of the anionic surfactant include alkylbenzenesulfonates, alkylphenylsulfonates, alkylnaphthalenesulfonates, higher fatty acid salts, higher fatty acid ester sulfuric ester salts, higher fatty acid ester sulfonates, higher alcohol ether sulfuric ester salts and sulfonates, higher alkyl sulfosuccinates, polyoxyethylene alkyl ether carboxylates, polyoxyethylene alkyl ether sulfates, alkylphosphates, and polyoxyethylene alkyl ether phosphates. Preferred of these anionic surfactants are dodecylbenzenesulfonates, isopropylnaphthalenesulfonates, monobutylphenylphenol monosulfonates, monobutylbiphenylsulfonates, and dibutylphenylphenol disulfonates.

Examples of the nonionic surfactants include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerol fatty acid esters, polyoxyethylene glycerol fatty acid esters, polyglycerol fatty acid esters, sucrose fatty acid esters, polyoxyethylene alkylamines, polyoxyethylene fatty acid amides, alkylalkanolamides, polyethylene glycol (PEG)-polypropylene glycol (PPG) block copolymers, acetylene glycol, and acetylene glycol polyoxyethylene adducts. Preferred of them are polyoxyethylene nonyl phenyl ether, polyoxyethylene octyl phenyl ether, polyoxyethylene dodecyl phenyl ether, polyoxyethylene alkyl ethers, polyoxyethylene fatty acid esters, sorbitan fatty acid esters, polyoxyethylene sorbitan fatty acid esters, fatty acid alkylolamides, PEG-PPG block copolymers, acetylene glycol, and acetylene glycol polyoxyethylene adducts.

Also useful as a surfactant are silicone surfactants, such as polysiloxane oxyethylene adducts, fluorine surfactants, such as perfluoroalkylcarboxylates, perfluoroalkylsulfonates, and oxyethylene perfluoroalkyl ethers, and biosurfactants, such as spiculisporic acid, rhanmolipid, and lysolecithin.

These surfactants may be used either individually or as a mixture thereof. The hydrophilic-lipophilic balance (HLB) of the surfactant is preferably 8 to 18 with considerations given to solubility and the like.

The HLB is defined by the following equation (by Griffin):

HLB=20×(weight of hydrophilic groups/molecular weight of the whole molecule)

It is preferred that the surfactant be of nonionic type and be modified with a silicone component so as to have a controlled HLB in view of compatibility between the liquid absorbing particles and the monomer. Examples of the silicone-modified nonionic surfactant are those having a PPG and/or a PEG component modified in its side chain with a dimethylsiloxane derivative and an acrylic residue and exhibiting photoreactivity and some viscosity. Modification of the surfactant with a silicone component is carried out in a known manner.

Examples of the polyfunctional acryl-modified surfactant modified with the silicone side chain component of a dimethylsiloxane polymer include dimethylsilicone polymers having at least one of a PEG component and a PPG component as a side chain.

A surfactant having a UV curable group may also be used. Examples of the UV curable group include those described above as a functional group having UV curing properties.

The amount of the surfactant in the image recording composition of the present embodiment is preferably 0.1% to 30%, more preferably 0.5% to 10%, by mass.

4. Other Components

The image recording composition may further contain other components as described below.

It is desirable for the image recording composition to contain a hydrophobic monomer having a functional group and a solubility parameter (sp value) of 7 to 9.6, particularly at least one hydrophobic monomer having an sp value of 8 to 9.6. Examples of the monomer with an sp value of 9.6 or less include neopentyl glycol diacrylate and its derivatives, hexanediol diacrylate, tripropylene glycol diacrylate, polyfunctional dipentaerythritol derivatives, ethylene oxide-modified phenoxyacrylates, alkoxyalkyl acrylates, cyclohexyl acrylate, and dicyclopentadiene acrylate.

The amount of the hydrophobic monomer having an sp value within the range recited in the image recording composition is preferably 1% to 30%, more preferably 5% to 30%, by mass.

Addition of the hydrophobic monomer to the image recording composition prevents the composition from excessively increasing in viscosity. Addition of the hydrophobic monomer to the image recording composition of the present embodiment is also believed to prevent liquid absorption hindrance from occurring in the image area T formed of the ink dots on the curable layer as well as prevent non-uniformity of image quality or density.

The hydrophobic monomers having an sp value in the range recited above may be used as a mixture of two or more thereof. The hydrophobic monomer is preferably mono-, di- or trifunctional, more preferably mono- or difunctional.

Examples of the functional groups possessed by the hydrophobic monomer include an acyclic or cyclic alkyl group having a long-chain alkoxy group, a branched alkoxy group, a cyclohexyl group, and a dimethylsiloxane derivative. Specific examples thereof are a lauryl group, a dodecyl group, a hexamethylene group, a pentaerythritol derivative, a trimethylolpropane derivative, a cyclohexyl derivative, butanediol, and a low molecular PEG (molecular weight: 200) derivative.

Preferred of them are lauryl and dodecyl.

It is preferred for the hydrophobic monomer have an alkylene oxide structure, particularly at least one of a propylene oxide structure and an ethylene oxide structure, more preferably both a propylene oxide structure and an ethylene oxide structure.

Specific examples of the hydrophobic monomer containing a functional group and having an sp value of 9.6 or less are as follows (the values in the parentheses are sp values obtained from the structural formula of the compound by the Fedors method):

monofunctional hydrophobic monomers, such as tetrahydrofurfuryl acrylate (9.6), cyclohexyl acrylate (9.6), isobornyl methacrylate (9.6), ethylhexyl acrylate (8.9), dodecyl methacrylate (8.8), lauryl acrylate (8.7), phenoxy(ethylene glycol (n=4)) acrylate (9.4); difunctional hydrophobic monomers, such as ethoxyethylene oxide acrylate (8.3), polypropylene glycol (≥1000) diacrylate (8.6), 1,6-hexanediol acrylate (9.6), diacrylates having a polyol main chain (e.g., PEG 200 (8.8), PEG 400 (8.5), and PEG 600 (8.4), all of which are available from Daicel-Cytec Co.), neopentyl glycol diacrylate (9.4), and glycidol dimethacrylate (9.1); and various polyether-modified acrylates and alicyclic acrylates, such as methoxypolyethylene glycol (n=8) acrylate (9.3), pentamethylpiperidyl methacrylate (8.7), tetrahydrofuryl acrylate (9.2), dicyclopentanyl acrylate (9.3), di- or tripropylene glycol acrylate (9 to 9.5), (vinyloxyethoxy)ethyl acrylate (8.7), (vinyloxyethoxy)ethyl methacrylate (8.7), ethylene oxide-modified polypropylene glycol dimethacrylate (8.2), neopentyl glycol diacrylate (9.4), polypropylene glycol acrylate (8.2), glycerol propoxy triacrylate (9.2), and ethoxylated trimethylol triacrylate (9.1).

It is desirable for the image recording composition to contain a polymerization initiator. Where needed, the image recording composition may contain a reaction aid, a polymerization accelerator, or the like to help the progress of the polymerization reaction.

In the case where the UV cure of the image recording composition proceeds through radical reaction, useful UV polymerization initiators include benzophenone, thioxanthone initiators, benzyl dimethyl ketal, α-hydroxyketones, α-hydroxyalkylphenones, α-aminoketones, α-aminoalkylphenones, monoacylphosphine oxides, bisacylphosphine oxides, hydroxybenzophenone, aminobenzophenone, titanocene initiators, oxime ester initiators, and oxy-phenyl acetic ester initiators.

In the case where the UV cure of the image recording composition proceeds through cationic reaction, useful UV polymerization initiators include aryl sulfonium salts, aryl diazonium salts, diaryl iodonium salts, triaryl sulfonium salts, allene-ion complex derivatives, and triazine initiators.

The image recording composition may contain a wax or a rubbery substance.

The image recording composition may contain a component that fixes an ink component on or in the curable layer (hereinafter sometimes referred to as a fixing component).

Examples of the fixing component include, but are not limited to, a component adsorbing an ink component (e.g., a colorant) and a component that agglomerates or thickens an ink component (e.g., a colorant).

The image recording composition may contain water or an organic solvent that dissolves or disperses a component contributory to the cure reaction.

The image recording composition may contain a colorant of various kinds to control coloration of the cured layer.

The image recording composition may contain a thermoplastic resin to control the viscosity and the like. Useful thermoplastic resins include acryl resins, polyester resins, polycarbonate resins, polyurethane resins, polystyrene, polyether resins, polyethylene resins, polypropylene resins, polystyrene, styrene-acrylic monomer copolymers, and mixtures thereof.

The image recording composition may have a surface tension ranging from 20 to 50 mN/m.

The image recording composition is preferably low-volatile or non-volatile at ambient temperature (25° C.). As used herein, the term "low volatile" is intended to mean to have a boiling temperature of 200° C. or higher under atmospheric pressure, and the term "non-volatile" is intended to mean to have a boiling temperature of 300° C. or higher under atmospheric pressure.

[Ink]

The ink as referred to above corresponds to "droplets" ejected to the curable layer.

While the ink for use in the invention may be either an aqueous ink or an oily ink, an aqueous ink is preferred for environmental considerations. An aqueous ink (hereinafter simply referred to as ink) contains an ink solvent (e.g., water or a water-soluble organic solvent) as well as a recording material. The ink may optionally contain additives.

The recording material is typically a colorant. The colorant may be a dye or a pigment and is preferably a pigment. The colorant to be used is chosen from among known materials.

The recording material may be selected from dyes, such as hydrophilic anionic dyes, direct dyes, cationic dyes, reactive dyes, polymer dyes, and oil-soluble dyes; wax or resin powders or emulsions colored with a dye; fluorescent dyes or pigments; infrared absorbents, UV absorbents, magnetic substances, such as ferromagnetic substances typified by ferrites and magnetite; semiconductors or photocatalysts typified by titanium oxide and zinc oxide; and other organic or inorganic particulate electron materials.

The amount or concentration of the recording material may range from 5% to 30% by mass based on the ink.

The volume average particle size of the recording material may range from 10 to 1000 nm. As used herein, the term "volume average particle size" denotes the particle size of the recording material per se when no additives adhere thereto or the particle size of the recording material inclusive of any additive adhering thereto. The volume average particle size is measured using Microtrac Particle Size Analyzer UPA 9340 from Leeds & Northrup as follows. Four milliliters of ink is put in a measuring cell, and measurement is made as instructed by the manual. The viscosity of the ink is inputted as "viscosity", and the density of the recording material (e.g., pigment) is inputted as "density of dispersed particles".

Examples of the water soluble solvent include polyhydric alcohols, polyhydric alcohol derivatives, nitrogen-containing solvents, alcohols, and sulfur-containing solvents.

These solvents may be used either individually or as a mixture thereof. The water soluble organic solvent may be used in an amount of 1% to 70% by mass.

Water for use in the ink is desirably ion exchanged water, ultrapure water, distilled water, or ultrafiltration water from the viewpoint of preventing impurity incorporation.

The ink may contain additives, such as a surfactant.

Useful surfactants include various anionic surfactants, nonionic surfactants, cationic surfactants, and amphoteric surfactants, with anionic or nonionic surfactants being preferred.

Other additives that may be added to the ink include penetrants for penetrability adjustment; compounds for controlling ink characteristics such as ejection stability, such as polyethyleneimine, polyamines, polyvinylpyrrolidone, polyethylene glycol, ethyl cellulose, and carboxymethyl cellulose; and alkali metal compounds for electroconductivity and pH adjustment, such as potassium hydroxide, sodium hydroxide, and lithium hydroxide. If desired, the ink may further contain a pH buffering agent, an antioxidant, an antifungal, a viscosity modifier, an electroconductive material, a UV absorber, and a chelating agent.

The ink may suitably have a surface tension of 20 to 45 mN/m.

The surface tension is measured using a Wilhelmy surface balance available from Kyowa Interface Science Co., Ltd. at 23° C. and 55% RH.

The ink may suitably have a viscosity of 1.5 to 30 mPa·s as measured using Rheomat 115 from Contraves at 23° C. and at a shear rate of 1400 s$^{-1}$.

The ink for use in the invention is not limited to the above described composition. For example, the ink may contain a functional material, such as a liquid crystal material or an electron material, as well as a recording material.

EXAMPLES

The invention will now be illustrated in greater detail with reference to Examples, but it should be understood that the invention is not limited thereto.

Example 1

Preparation of ITB

A 370 mm wide, 1150 mm long, and 75 μm thick olefin-treated polyethylene terephthalate (PET) film TP01 is obtained from Panac Co., Ltd. as a transparent belt base having opposite ends.

Separately, a 100 μm thick, release-treated PET film available from Tohcello Co., Ltd. is provided as a release base. A liquid layer of a UV curable (uncured) transparent polyurethane elastomer VISELA from Inoac Corp. is formed on the release base.

The transparent belt base is wrapped around an aluminum cylindrical jig having a diameter of 366 mm and a length of 400 mm with its opposite ends spaced away from each other by 5 mm to make a tubular shape.

The release base having the liquid curable polyurethane elastomer layer is superposed on and in contact with the outer periphery of the tubular belt base inclusive of the space between the opposite ends with the liquid curable polyurethane elastomer layer in between the transparent belt base and the release base.

The liquid layer is irradiated with UV light (halogen light of 300 mJ) from the release base side. As a result, the UV curable transparent polyurethane elastomer cures to form a transparent polyurethane elastomer layer with a thickness of 30 μm. The total thickness of the transparent belt base and the transparent polyurethane elastomer layer is 105 μm.

The transparent belt base having the transparent polyurethane elastomer layer is removed from the cylindrical jig, and the release base is stripped off the transparent polyurethane elastomer layer.

The space between the ends of the transparent belt base is filled with a photocurable urethane adhesive FP 2010 from DIC Corp. by syringing and then caused to cure by UV irradiation (halogen light, 300 mJ) to form a joint connecting the ends.

An ITB is obtained by the above described steps. The ITB has a tensile strength at break of 8.8 N/mm at the joint and 18 N/mm in other than the joint.

Evaluation:

The resulting ITB is assembled into an image recording device of the exemplary embodiment illustrated in FIG. 10 (available from Fuji Xerox). An image is recorded using the image recording device, and the recorded image is visually evaluated. As a result, no disturbance of transfer nor deterioration of image due to a level difference on the outer periphery of the ITB (the level difference because of the joint) is observed.

Fluorosurf FG 5020TH from Fluoro Technology Co., Ltd. is applied by spray coating to the outer periphery of the ITB of Example 1 to form a surface release layer. The resulting ITB is evaluated in the same manner as described above. As a result, no disturbance of transfer nor deterioration of image due to a level difference on the outer periphery of the ITB (the level difference because of the joint) is observed. Besides, the ITB exhibits improved release and transfer.

A UV curable transparent polyurethane elastomer is applied by centrifugal coating to the inner periphery of the ITB of Example 1 and cured to form a 55 μm thick transparent polyurethane elastomer layer, and the resulting ITB is evaluated in the same manner as described above. As a result, no disturbance of transfer nor deterioration of image due to wobbly rotational movement of the ITB as well as due to the level difference on the outer periphery of the ITB (the level difference because of the joint) is observed.

Example 2

Preparation of ITB

A 370 mm wide and 1148 mm long PET laminate film composed of T60PET film and TPX (trimethylpentene) film (thickness: 75 μm/25 μm) is obtained from Kurabo Industries Ltd. as a transparent belt base having opposite ends.

The PET laminate film is wrapped around an aluminum cylindrical jig having a diameter of 366 mm and a length of 400 mm with its opposite ends overlapping to make a tubular shape.

The overlapping portion of the transparent belt base is welded by ultrasonic welding to form a joint.

The joint is covered with a 100 μm thick PET sheet having a 20 mm thick silicone release layer available from Tohcello Co., Ltd.

With the PET sheet serving as a mask, a UV-curable (uncured) transparent polyurethane elastomer liquid VISLEA from Inoac Corp. is applied to the outer periphery of the transparent belt base by flow coating and cured. The PET sheet is removed to form a discontinuous transparent polyurethane elastomer layer having a thickness of 60 μm.

The space of the discontinuous transparent polyurethane elastomer layer is filled with a UV curable (uncured) transparent polyurethane elastomer liquid VISLEA from Inoac Corp. After leveled, the liquid layer is cured to make the discontinuous transparent polyurethane elastomer layer continuous. There is thus formed a transparent polyurethane layer on the outer periphery of the transparent belt base.

Fluorosurf FG 5020TH from Harves Co., Ltd. is applied by dip coating to the outer periphery of the transparent polyurethane layer to form a surface release layer.

An ITB is thus obtained by the above described steps. The ITB has a tensile strength at break of 8.8 N/mm at the joint and 10.3 N/mm in other than the joint.

Evaluation:

The resulting ITB is set on an image recording device of the exemplary embodiment illustrated in FIG. 10 (available from Fuji Xerox). An image is recorded using the image recording device, and the recorded image is visually evaluated. As a result, no disturbance of transfer nor deterioration of image due to a level difference on the outer periphery of the ITB (the level difference because of the joint) is observed.

An ITB prepared in the same manner as described above except that the surface release layer is not formed is evaluated in the same manner. As a result, no disturbance of transfer nor deterioration of image due to a level difference on the outer periphery of the ITB (the level difference because of the joint) is observed. However, slight image transfer disturbance is observed because of slight reduction of surface release properties.

A UV curable transparent polyurethane elastomer FP2010 from DIC is applied by centrifugal coating to the inner periphery of the ITB of Example 2 and cured to form a 100 μm thick transparent polyurethane elastomer layer, and the resulting ITB is evaluated in the same manner as described above. As a result, no disturbance of transfer nor deterioration of image due to wobbly rotational movement of the ITB as well as due to the level difference on the outer periphery of the ITB (the level difference because of the joint) is observed.

Comparative Example 1

Preparation of ITB

A 370 mm wide, 1149 mm long, and 75 μm thick olefin-treated PET film TP01 is obtained from Panac Co., Ltd. as a transparent belt base having opposite ends. The PET film is wrapped around an aluminum cylindrical jig having a diameter of 366 mm and a length of 400 mm with its opposite ends overlapping by 0.5 mm to make a tubular shape.

The overlapping portion of the transparent belt base is welded by ultrasonic welding to form a joint.

An ITB is thus obtained by the above described steps. The ITB has a tensile strength at break of 5.5 N/mm at the joint and 7.5 N/mm in other than the joint.

Evaluation:

The resulting ITB is set on an image recording device of the exemplary embodiment illustrated in FIG. 10 (available from Fuji Xerox). An image is recorded using the image recording device, and the recorded image is visually evaluated. As a result, disturbance of transfer and deterioration of image due to a level difference on the outer periphery of the ITB (the level difference because of the joint) are observed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A method for making an intermediate transfer belt for use in an image recording device comprising:
    shaping a transparent belt base having opposite ends into a tubular shape with the ends thereof spaced away from or in contact with each other to make a tubular belt base,
    forming a continuous transparent polyurethane elastomer layer on the outer periphery of the tubular belt base, the forming the continuous transparent polyurethane elastomer layer comprising: forming a discontinuous transparent polyurethane elastomer layer on the outer periphery of the tubular belt base excluding the space or the contact portion between the ends; filling the gap of the discontinuous transparent polyurethane elastomer layer located on the space or the contact portion with a liquid of a curable polyurethane elastomer; and curing the liquid in the gap, and
    connecting the ends of the tubular transparent belt base spaced away from or in contact with each other to form a joint.

2. The method for making an intermediate transfer belt according to claim 1, further comprising: forming a transparent polyurethane elastomer layer on the inner periphery of the transparent belt base after the forming a joint.

3. The method for making an intermediate transfer belt according to claim 1, further comprising: forming a surface release layer on the outer periphery of the continuous transparent polyurethane elastomer layer after the forming the continuous transparent polyurethane elastomer layer on the outer periphery of the transparent belt base.

4. The method for making an intermediate transfer belt according to claim 2, further comprising: forming a surface release layer on the outer periphery of the continuous transparent polyurethane elastomer layer after the forming the continuous transparent polyurethane elastomer layer on the outer periphery of the transparent belt base.

* * * * *